Nov. 18, 1958 E. S. BRISTOL 2,861,194
CONTROL SYSTEMS FOR ELECTRICAL GENERATING UNITS
Filed Jan. 26, 1956 5 Sheets-Sheet 2

Nov. 18, 1958 E. S. BRISTOL 2,861,194
CONTROL SYSTEMS FOR ELECTRICAL GENERATING UNITS
Filed Jan. 26, 1956 5 Sheets-Sheet 3

Nov. 18, 1958  E. S. BRISTOL  2,861,194
CONTROL SYSTEMS FOR ELECTRICAL GENERATING UNITS
Filed Jan. 26, 1956  5 Sheets-Sheet 4

INVENTOR
EDWARD S. BRISTOL
BY Woodcock and Phelan
ATTORNEYS

United States Patent Office 2,861,194
Patented Nov. 18, 1958

2,861,194

CONTROL SYSTEMS FOR ELECTRICAL GENERATING UNITS

Edward S. Bristol, Philadelphia, Pa., assignor to Leeds and Northrup Company, Philadelphia, Pa., a corporation of Pennsylvania Application January 26, 1956, Serial No. 561,408

21 Claims. (Cl. 290—2)

This invention relates to control systems for electrical generating units usually comprising an alternator, a prime mover for driving it and a vapor generator for supplying the prime mover.

In accordance with a principal feature of the invention, both under constant and varying generation requirements of the unit, a predetermined relationship is maintained between the electrical output of the generator and the pressure of the vapor available for supply to its prime mover.

In some embodiments of the invention, the heat input to the vapor generator is controlled by means responsive to the electrical generation required of the unit and the rate of supply of vapor to the prime mover is controlled by means responsive to the pressure of the vapor. In such embodiments, it is preferred that the heat input control be actuated primarily in accordance with required generation and secondarily by pressure and that the vapor pressure control be primarily in accordance with pressure and secondarily in accordance with generation so as to take into account the sense and magnitude of the controlled variables upon the measured variables. More specifically, the secondary control effect may be introduced as an additional quantity in a computing or measuring network for a control primarily responsive to the other measured variable or it may be introduced into a control circuit for the other measured variable.

In other embodiments of the invention, the rate of supply of vapor to the prime mover is controlled in accordance with concurrent values of the generation requirement, the actual generation and the available vapor pressure and the heat input to the vapor generator is controlled from vapor pressure.

The invention further resides in control systems having features of novelty and utility hereinafter described and claimed.

For a more detailed understanding of the invention, reference is made to the following description of the accompanying figures of drawing, in which.

Figure 1:
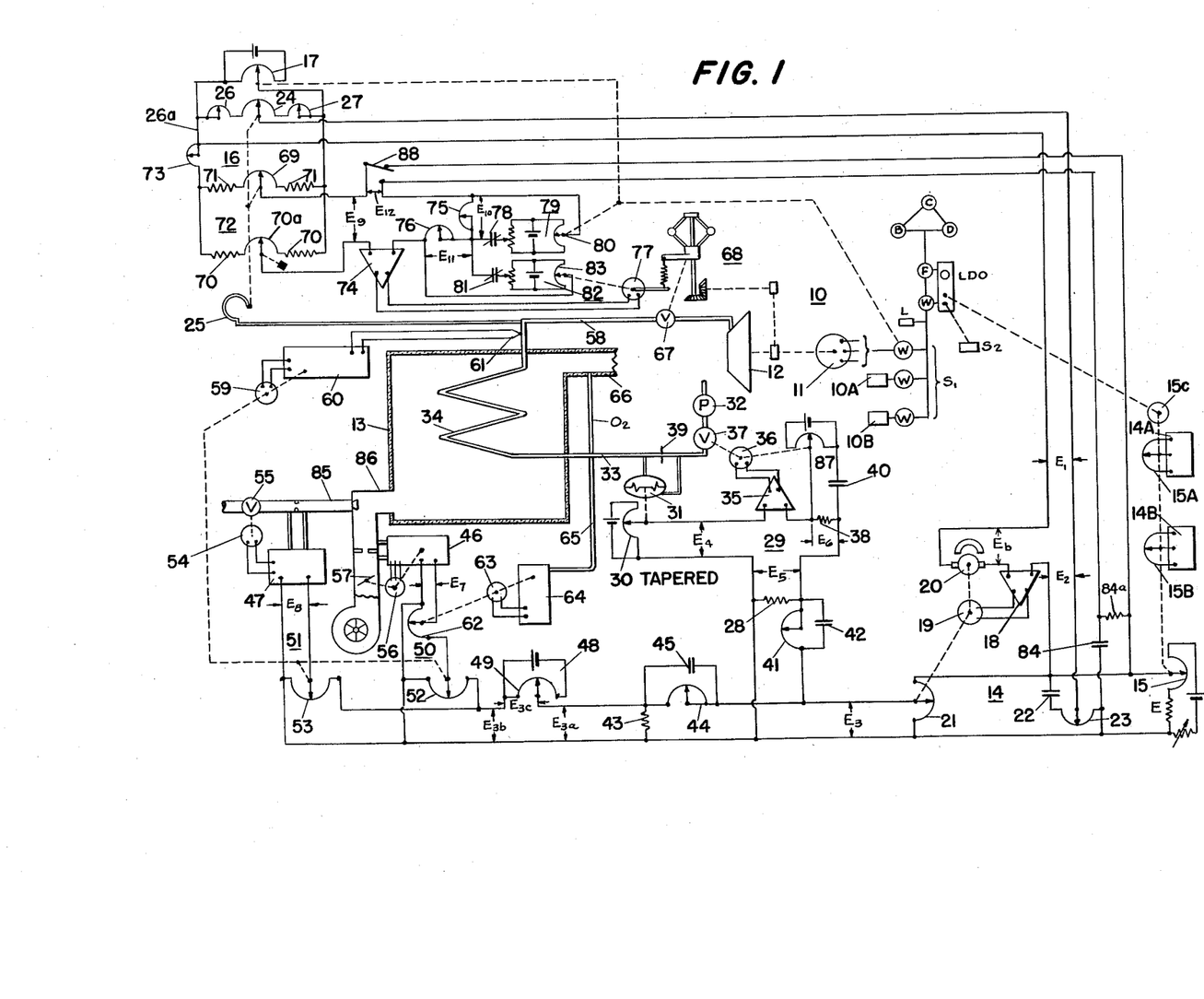
Fig. 1 schematically illustrates a complete control system for an electrical generating unit.

Referring to Fig. 1 of the drawings, the electrical generating unit 10 comprises an electrical generator or alternator 11, a turbine 12 for driving the alternator and a vapor generator or boiler 13 for supplying steam to the turbine. This generating unit supplies electrical power to a distribution network including for example areas A–D each having its own generating equipment and its own area load. These areas are interconnected by tie-lines over which an individual area, such as area A of which generating unit 10 is a component, may send or receive power to or from the rest of the system in accordance with an area schedule based on tie-line load, system frequency, time error, or other operating variables of the generating and distribution system. Upon deviation of an area from its schedule, new generation requirements are imposed upon individual generating units of that area.

The control system of Fig. 1 closely regulates the rates of supply of feed water, fuel and air to boiler 13 to match the actual electrical output of generator 11 with the varying generation demands imposed upon unit 10 while maintaining the temperature and pressure of the steam output of the boiler at values predetermined for proper operation. This control system is therefore particularly suited for boilers of the supercritical pressure type having low heat storage due to absence of steam drums.

In the system of Fig. 1, signals for controlling the supply of feed water, fuel and air to the boiler are derived from an electrical network 14. The signal voltage E developed across this network is of value varying with the generation required of unit 10 to meet its share of the existing area schedule. Such voltage may be produced and varied with change of unit-generation requirements in any of various ways including those shown in Nichols et al. Patent 2,692,342, copending application Serial No. 344,838 upon which has issued Cohn Patent 2,773,994, copending application Serial No. 211,663 upon which has issued Phillips Patent 2,754,429 and copending application Serial No. 450,025, upon which has issued Miller Patent 2,836,731. For simplicity and purpose of explanation here, the voltage E is is shown as derived from a potentiometer slidewire 15 which is positioned by a telemetric receiver 15C in response to signals from the load dispatcher's office LDO for area A. For steady-state conditions of the generation requirement, the signal voltage $E_2$ is equal to voltage E.

The signal voltage $E_1$ varying with the actual output of generator 11, as distinguished from the generation required of it to meet its schedule, is derived from network 16 which includes slidewire 17 positioned by wattmeter W metering the electrical output of generator 11. In absence of its modification in accordance with boiler pressure, a feature later described, the signal voltage $E_1$ represents the existing actual electrical output of unit 10.

When the actual generation of unit 10 is not equal to the generation requirement, a controller 18 responsive to the unbalance of voltages $E_1$, $E_2$ effects operation of a reversible motor 19 in direction depending upon the sense of the unbalance. Controller 18, as well as others of the system, may be of any suitable type such as shown for example in Letters Patent 2,666,170. A small D. C. generator 20 driven by motor 19 produces a voltage $E_b$ in opposition to the initiating unbalance of voltages $E_1$, $E_2$. These three voltages, through controller 18, effect operation of motor 19 and tachometer generator 20 at a speed substantially proportional to the difference between voltages $E_1$, $E_2$.

The motor 19 also adjusts the slidewire 21 of network 14 so that the slidewire position is representative of the time integral of the difference between voltages $E_1$, $E_2$. Thus the output voltage $E_3$ of network 14 used as hereinafter described for control of feed water, fuel and air input to boiler 13, is dependent both upon the generation requirement of unit 10, as represented by voltage E, and upon the time integral of the difference between the required generation and the actual generation of unit 10, as represented by the difference between voltages $E_1$, $E_2$.

So long as the generation requirement is changing and for an appreciable time thereafter, the magnitude of voltage $E_2$ lags that of the generation-requirement voltage E due to inverse rate action provided by capacitor 22 and resistance 23, either or both of which may be adjustable to vary the time constant of the delay network 22, 23 to suit the operating characteristics of generating unit 10. In effect, the voltage $E_2$ is therefore the algebraic sum of voltage E and a second voltage whose difference from voltage E varies as a direct function of the rate of change of voltage E.

When the steam pressure available for supply to the turbine 12 is higher or lower than a predetermined or set value, the signal voltage $E_1$ is modified and in effect has a component of magnitude and sign depending upon the deviation from a predetermined or normal steam pressure so that at all times the voltage $E_1$ represents the actual generation modified in amount dependent upon deviation from normal vapor pressure. This modifying control effect is produced in the system of Fig. 1 by coupling the slidewire 24 of network 16 for adjustment by Bourdon tube 25, or equivalent device, responsive to the pressure of steam generated by boiler 13. The slidewires 26, 27 in series with slidewire 24 in the same branch of network 16 are manually preset so that when the pressure is normal, the voltage difference $E_1$ between the contact of slidewire 24 and conductor 26a represents only the actual electrical output of unit 10; whereas when the steam pressure is above or below the normal or control point value, the voltage $E_1$ is correspondingly above or below the value corresponding with actual electrical output. Thus, for example, if the steam pressure in supply line 58 is already high upon occurrence of an increase in the electrical generation requirement, the voltage $E_1$ contains this pressure information and, as reflected in the output signal voltage $E_3$ of network 14, avoids an unnecessarily large demand for increased steam generation which will be partially met by the steam pressure control action later described.

As appears from the foregoing, the signal voltage output $E_3$ of network 14 contains information concerning the required electrical generation and the integrated difference between actual electrical generation (compensated for steam pressure deviation) and the electrical generation requirement. This signal, as above stated and as now explained, is used to control the rate of supply of feed water and the firing rate of boiler 13.

For control of feed water, signal voltage $E_5$ is introduced by resistor 28 into control network 29 which includes slidewire 30 adjusted by the flow-responsive device 31. Thus, the effective voltage output $E_4$ of slidewire 30 depends upon the rate at which feed water is supplied by pump 32 through feed line 33 to the tubes 34 of boiler 13. The slidewire winding may be electrically tapered so that the slidewire output $E_4$ is a linear function of the rate of flow, in correction of the square law relation between the pressure differential applied to device 31 and the feed water flow producing that differential across orifice plate 39, or equivalent.

When voltage $E_4$ is larger or smaller than voltage $E_5$, the controller 35 responds to the unbalance and effects energization of reversible motor 36 to adjust feed water valve 37 in proper direction to restore balance. During its rotation, motor 36 also adjusts slidewire 87 of network 29 to produce across resistor 38 a feedback voltage $E_6$ whose magnitude, because of interposed capacitor 40, depends upon the rate of change of the valve setting and therefore upon the rate of change of the rate of flow of feed water. The voltage $E_6$ is of polarity to reduce the unbalance of network 29 as applied to controller 35 and so minimizes overshooting or hunting of the valve 37 and slidewire 30. The capacitor 40 and resistance 38 may be adjustable to select the desired action.

Preferably and as shown, a rate network comprising resistor 41 and capacitor 42 is included in circuit between networks 14 and 29 so that the signal voltage $E_5$ across resistor 28 depends not only upon the signal voltage $E_3$, but also the rate at which voltage $E_3$ changes. For example, upon an abrupt change of signal voltage $E_3$ to a new higher value, the voltage $E_5$ rises sharply to a higher value and then more slowly falls to a fraction of the new value of voltage $E_3$ determined by the preset ratio of resistances 28, 41. Either or both resistor 41 and capacitor 42 may be adjustable to change this rate action to suit the response and operating characteristics of the particular installation.

Thus upon a change in generation requirement, the rate of supply of feed water is changed in response to signal $E_3$ until the actual electrical generation of unit 10 matches the new generation required of that unit, assuming, of course, that the rate of combustion in the boiler is also properly varied, as hereinafter described.

The control arrangements, exemplified by blocks 46, 47, which respectively control the air and fuel for steam generator 13 may be generally similar to that above described for control of boiler feed water in that a voltage representative of the controlled variable is balanced against a signal ($E_7$, $E_8$) including, at least as one component, the generation information contained in the signal voltage output $E_3$ of network 14.

For control of fuel and air, the signal $E_3$ is applied to a potential-divider network 43, 44 to provide a signal voltage $E_{3a}$ which under steady-state conditions is a preselected fraction of $E_3$. To provide a rate action similar to that of network 41, 42 above described, the network 43, 44 may also include capacitor 45 which may be adjustable. Thus, the magnitude of voltage $E_{3a}$ is a function of both the magnitude of voltage $E_3$ and the rate of change thereof. The bias network 48 includes a slidewire 49 which is manually set so that the biasing voltage $E_{3c}$ corresponds with the firing rate required under no-load conditions to supply the constant losses of steam generator 13. The sum of signal voltage $E_{3a}$ and the biasing voltage $E_{3c}$ provides the modified signal voltage $E_{3b}$ which is applied to the control networks 50, 51 for the fuel and air controllers 46, 47. Specifically, the signal voltage $E_{3b}$ is applied to slidewires 52, 53 respectively included in control networks 50, 51.

When the effective signal output voltage $E_8$ of slidewire 53 does not correspond with the required rate of supply of fuel, the reversible motor 54 is operated in response to action of controller 47 to actuate valve 55, or equivalent, in the fuel supply line 85 to burner 86. Thus, the rate of supply of oil, gas, or other fuel to burner 86 is controlled in accordance with all of the information factors above described as contained in the signal voltage $E_3$ of network 14.

Similarly, when the actual rate of air supply does not correspond with the signal voltage $E_7$ derived from slidewire 52, the reversible motor 56 is operated by controller 46 to adjust the air valve 57, or equivalent, in accordance with the information contained in signal voltage output $E_3$ of network 14.

Either or both of slidewires 52, 53 may be automatically adjusted in response to temperature changes of the vapor produced in generator 13 to change the relationship between feed water input and heat input. In the particular system shown, the slidewires 52, 53 are concurrently automatically adjusted in response to temperature changes of the vapor simultaneously to change both the air and fuel flow so that the relationship between feed water flow and heat input will be altered as required to maintain the desired temperature in steam line 58. In the particular system shown, this concurrent adjustment of slidewires 52, 53 is effected by reversible motor 59 under control of controller 60 having an element, exemplified by thermocouple 61, responsive to the temperature of the generated steam.

In addition to provision for automatic readjustment of the ratio between heat input and feed-water flow in response to deviation from desired vapor temperature, the system of Fig. 1 also provides for readjustment of the fuel-air ratio to maintain high combustion efficiency. For such purpose, the network 50, for example, includes a slidewire 62 which is automatically adjusted in accordance with the content of oxygen, or other index of completeness of combustion, in the flue gases from generator 13. As indicated, the slidewire 62 may be operated by reversible motor 63 of a controller 64 including a gas analyzer, such as shown for example in U. S. Letters Patent 2,422,129 connected by sampling line 65 to the boiler stack 66.

Thus, the signal voltage output $E_3$ of network 14, representative of required generation and of the difference between the actual electrical generation of unit 10 and its required generation, is utilized to control the rates of supply of water, fuel and air to generator 13 with maintenance of the proper ratio of heat input to feed water for the desired steam temperature and with proper fuel-air ratio for efficient combustion.

Other factors affecting operating conditions of the vapor generator may be controlled from signal $E_3$. For example, to maintain the transition from water to steam at a particular zone in a supercritical pressure type of vapor generator, a controller 60A (Fig. 1A) responsive to the output of a temperature sensitive device 61A in that zone and to control signal $E_3$ may control purging of feed water: Other elements affecting heat transfer relation within the vapor generator unit such as flue-gas by-pass dampers, flue-gas recirculating dampers, tilting burners, desuperheating spray-water valves, and the like, generically represented by structure X (Fig. 1B), may be similarly controlled from signal $E_3$.

As above described, the voltage $E_1$ representative of the actual electrical output of unit 10 is modified in accordance with deviations from desired pressure of the vapor generated by generator 13 of the unit 10. A signal voltage $E_9$ also containing information relating to steam-pressure deviation and electrical output can be used to control the turbine valves represented by valve 67 as shown in Fig. 1. Such control is preferably effected through the speed governor 68 to provide prompt speed regulation in the event of a major load disturbance and also normally slightly to throttle the steam supplied to the turbine for maintenance of the desired pressure in steam line 58.

For such control of the steam valve 67, the network 16 includes a slidewire 69, positioned by pressure-responsive device 25, and resistors 70, 70 forming with slidewire 70a a subsidiary bridge 72 which is in balance when the steam pressure is at the control point as set manually by adjustment of the slidewire 70a or automatically by adjustment from wattmeter W, slidewire 15 or other element representative of load conditions. The supply voltage applied to bridge 72 varies as a function of actual generation since wattmeter W controls the setting of slidewire 17 of network 16. The extent to which the bridge supply voltage incrementally varies with change of actual generation is preset by manual adjustment of slidewire 73. Optionally, the supply for bridge 72 may be a fixed voltage as in Fig. 1C.

The controller 74 compares the unbalance voltage $E_9$ of bridge 72 with the algebraic sum of fedback voltages $E_{10}$, $E_{11}$ and voltage $E_{12}$; the voltages $E_{10}$ and $E_{11}$ respectively produced across slidewires 75, 76 are respectively representative of the extent and rate of change of actual electrical generation by unit 10 and the extent and rate of resetting of governor 68 and voltage $E_{12}$ is related to the rate of change of voltage E. The unbalance voltage $E_9$ of network 72 may be zero, or of either polarity, depending upon the sense of pressure-deviation from the control point.

To produce voltage $E_{10}$, the slidewire 75 is connected through capacitor 78 to a network 79 including slidewire 80 positioned by wattmeter W. With actual generation constant for an appreciable time, the voltage $E_{10}$ is zero. However, while the actual generation is increasing or decreasing, and for an appreciable time thereafter, the charging or discharging current of capacitor 78 flows through slidewire 75 to provide a voltage $E_{10}$ whose polarity depends upon the sense in which the electrical output of alternator 11 is changing and whose magnitude depends upon the rate at which such generation is changing. To produce voltage $E_{11}$, the slidewire 76 is similarly connected through capacitor 81 to a network 82 including a slidewire 83 adjusted by reversible motor 77 concurrently with its adjustment of governor 68 under control of controller 74.

As shown, the slidewires 75, 76 across which voltages $E_{10}$, $E_{11}$ are produced are adjustable to permit selection of the individual magnitudes and relative magnitudes of the actions afforded by networks 79, 82. With slidewire 75 set for zero effective value, the controller feedback action is dependent solely on the position of motor 77; with slidewire 76 set for zero effective value, the controller feedback action is dependent solely on the actual electrical output.

Voltage $E_{12}$ is related to the rate of change of voltage E by means of capacitor 84 and resistor 84a, either of which may be adjustable to change the time constant of the combination. Introduction of the rate voltage $E_{12}$ in circuit with bridge 72 makes it possible to utilize some of the energy stored in the vapor generator 13 to accommodate rapidly any change in the load on generator 11. For instance, if there is an increase in the generation requirement, as indicated by a change in voltage E, there will be initially presented to the pressure control a voltage $E_{12}$ which will cause the controller 74 to operate motor 77 in a direction to open valve 67 in anticipation of the steam pressure change which will result from the increased firing rate as accomplished by controller 47 in response to the changed generation requirement. By changing the position of switch 88 from the position shown to the deflected position, the voltage $E_{12}$ is excluded leaving only the feedback voltages $E_{10}$, $E_{11}$ in opposition to voltage $E_9$.

In general, when the scheduled electrical generation required of generator 11 of unit 10 differs from the actual electrical generation, the control system described responds to vary the heat input and feed water to the vapor generator of the unit to reduce the difference between the actual and required electrical outputs, and in such control takes into consideration the many additional factors above discussed.

By suitable modification in the arrangement of the elements of the fuel feed control, it is possible more advantageously to utilize the system described above with a vapor generator which is fired by solid fuels. Since it is generally not possible to alter the heat input to the vapor generator as promptly with solid fuels as is the case with fluid fuels, proportioning of the air supplied for combustion becomes a more difficult problem. To meet solid fuel requirements, the supply of air can be proportioned in accordance with a signal, such as actual generation, which is indicative of the heat release of the fuel. Such control of air supply will introduce the desired lag in air supply as compared with the fuel supply. Also the feed water supplied can be tied directly to voltage E representative of required electrical output of generator 11.

Figures 1A, 1B, 2, 3:
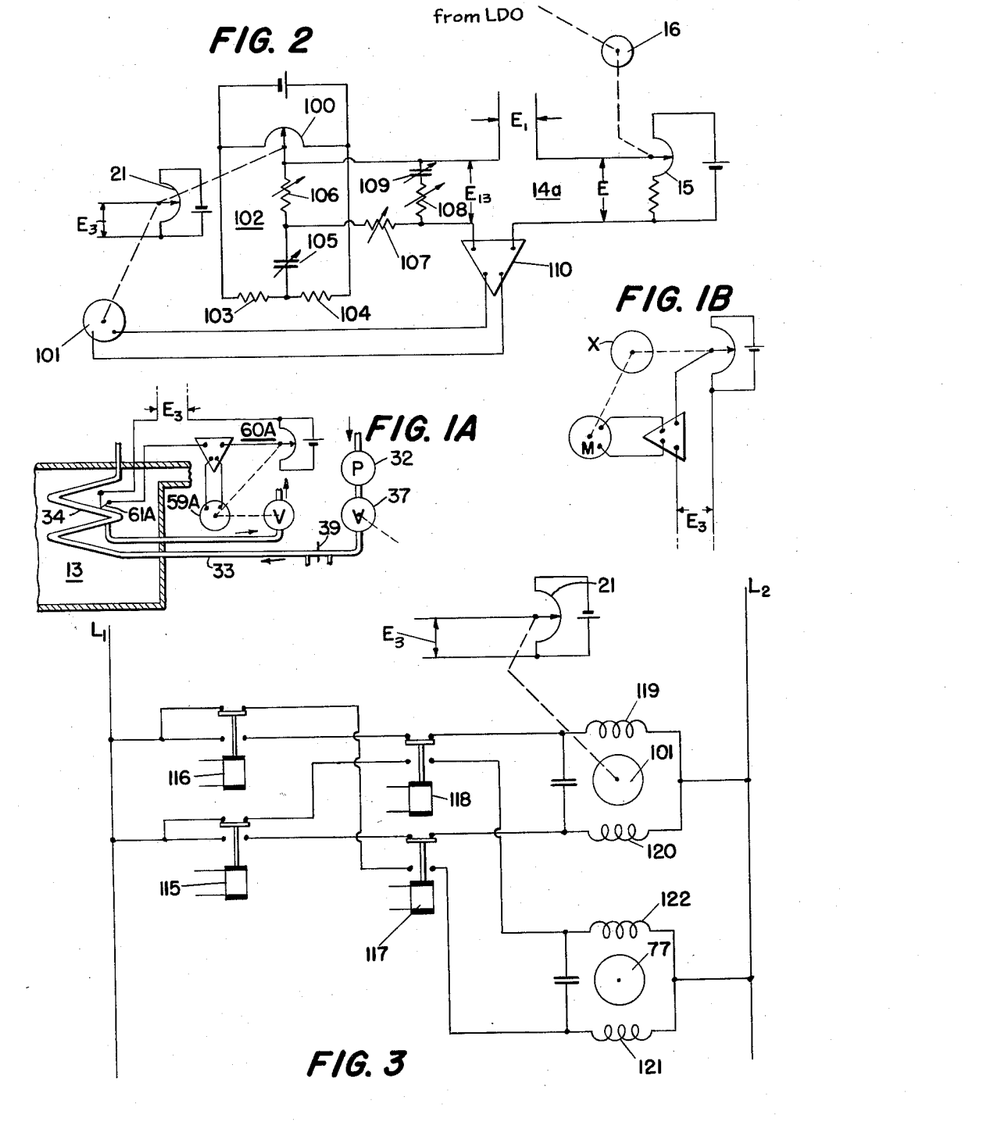
Figs. 1A, 1B, 1C, 1D schematically illustrate modifications of portions of the system of Fig. 1.
Fig. 2 is a modification of part of the control system of Fig. 1.
Fig. 3 is an interlock system for control motors of Fig. 1.
Figures 1C, 4:
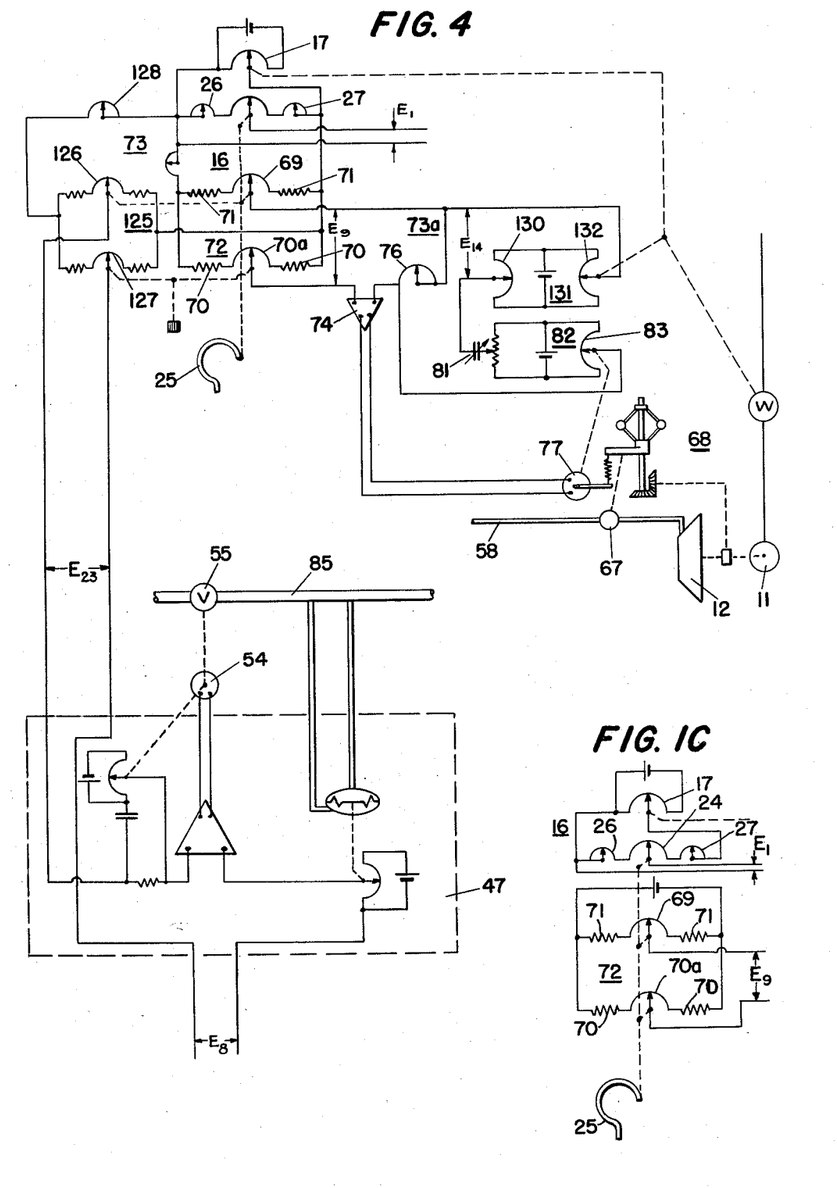
Figs. 4 and 5 are modifications of portions of the control system of Fig. 1.
Figure 1D:
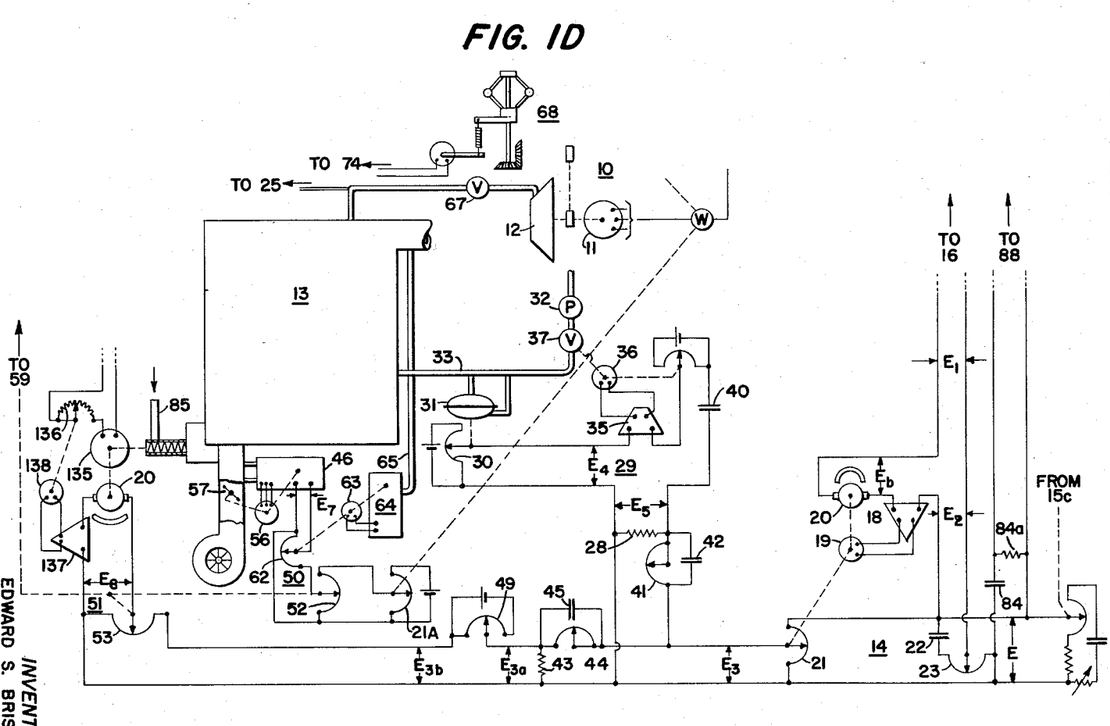

Such modifications of the system of Fig. 1 are shown in Fig. 1D. Specifically, the supply of air is proportioned in accordance with the signal derived from slidewire 21A whose adjustable element is positioned by wattmeter W in accordance with the actual output of generator 11. As in Fig. 1 of my Patent 2,681,418, the rate of supply of solid fuel is reproduced as the output of tachometer generator 20F coupled to the fuel feed motor 135. The speed of motor 135 is variable as by rheostat 136, or other speed control means whose setting is adjusted by controller 137 through its reversible motor 138 to maintain balance between the output of tachometer 20F and the signal $E_8$ derived from the generation-requirement voltage E.

These modifications do not affect the basic mode of control of Fig. 1 because the heat input to the vapor generator is still controlled from a signal related to the required electrical output of generator 11 and the steam pressure is controlled by positioning throttle valve 67 to maintain the desired set steam pressure with the control action modified in accordance with the actual output of generator 11.

Other similar generating units 10A, 10B of generating station $S_1$ of area A may in like manner be controlled by networks 14A, 14B respectively including slidewires 15A, 15B corresponding with slidewire 15 of network 14 and set by telemetric receiver 15C to meet their predetermined shares of the generation requirement of the station $S_1$.

In Fig. 2 there is shown an alternative arrangement for obtaining voltage $E_3$ which is a function of the position of slidewire 15, for providing requirement-signal voltage E, and for providing the voltage $E_1$, representative of the actual generation of alternator 11 as modified in bridge 16 by the steam pressure signal. The bridge input circuit 14a of controller 110 compares the difference between the voltages $E_1$ and E, which difference represents the deviation of the actual output of generator 11 from the desired output. This difference is then compared with a feedback signal obtained from slidewire 100 which is coupled for actuation directly from motor 101. Slidewire 100 forms two arms of bridge 102 which includes in other arms resistors 103 and 104, preferably of equal value. Between the junction of resistors 103 and 104 and slidewire 100, there are introduced the capacitor 105 and resistor 106 which in combination serve to introduce into the control bridge 14a a potential which causes motor 101 to be positioned in accordance with the time integral of the deviation between voltages $E_1$ and $E_2$ as well as in direct proportion to the deviation. In addition, resistors 107 and 108 in conjunction with capacitor 109 introduce rate action into the control, this action being effectively in accordance with the first derivative of the deviation between voltages $E_1$ and E. The controller 110 causes motor 101 to rotate in the proper sense for positioning slidewire 100 in a manner to produce across the combination of resistor 108 and capacitor 109 a voltage $E_{13}$ of magnitude which balances the difference between potentials $E_1$ and E. Simultaneously with the positioning of slidewire 100, the slidewire 21 is positioned to change the voltage $E_3$. This voltage therefore is changed not only in direct proportion to the difference between potentials $E_1$ and E but also in proportion to the first derivative of that difference and its time integral. Voltage $E_3$ may then be utilized in the same manner as shown in Fig. 1, namely, as a master loading signal to which is related the feed-water control as well as the fuel and air-flow control.

To provide a hereinafter discussed coordination between the control of heat input to the vapor generator 13 and the pressure control as accomplished by actuation of valve 67 (Fig. 1), there may be utilized a circuit of the type shown in Fig. 3 which provides for interlocking of the controls affecting the heat input and those affecting the pressure. Utilizing the circuit of Fig. 2 as the means for obtaining the voltage $E_3$, it is possible to interconnect relays contained in controller 110 for the actuation of motor 101 in either one direction or another with the relays of controller 74 (Fig. 1), which cause actuation of motor 77 in the proper direction, so that there will be prevented an undesired interaction between the fuel input control and the pressure control. In the particular arrangement of Fig. 3, this is accomplished by connecting relays 115 and 116, which are the motor-control relays contained in controller 110, in such manner that they are in the positions shown when there is no unbalance between voltage $E_{13}$ and the difference between voltages $E_1$ and E. Relay 115 is arranged to be actuated for movement in a downward direction against the lower contacts when bridge 14a is unbalanced in a sense which requires movement of motor 101 in a direction to increase voltage $E_3$ for increase of the fuel input of vapor generator 13. Likewise relay 116 is energized for movement in a downward direction against the lower contacts upon an opposite sense of unbalance in bridge 14a such as would require a decrease in voltage $E_3$ for decrease of the fuel input.

Relays 117 and 118 are motor-control relays of controller 74. Relay 117 is connected for energization to produce downward movements of its armature against the lower contacts upon an unbalance in the pressure control bridge indicative of a need for a decrease in steam pressure whereas relay 118 is arranged to be energized for downward movement of its armature when the sense of unbalance of pressure control is such as to require an increase in pressure for correction toward the desired value as set on slidewire 70a.

Motor 101 of Fig. 3 corresponds with the motor 101 of Fig. 2 and is operated in a direction to decrease the voltage $E_3$ when winding 119 is energized and to increase voltage $E_3$ when winding 120 is energized.

Motor 77 of Fig. 3 corresponds to motor 77 of Fig. 1 and is arranged to provide an increase in valve opening upon energization of winding 121 and provides valve movement in the opposite direction to decrease the valve opening and hence increase the steam pressure upon energization of winding 122.

When there is a balanced condition in bridge 14a (Fig. 2), relays 115 and 116 will be in the positions shown and if the pressure control is likewise in a balanced condition, relays 117 and 118 will be in the positions shown and as a result there will not be any continuous circuit between supply line $L_1$ and supply line $L_2$ to any of the windings of motors 77 and 101. When the unbalance of control bridge 14a is the proper sense to actuate relay 115 and if at the same time the pressure control is in a balanced condition, there will be completed between lines $L_1$ and $L_2$ a circuit for flow of current through motor winding 120 which will then serve to increase the potential $E_3$ by movement of slidewire 21. As a result of an increase in potential $E_3$, there will be an increase in the feed-water flow, the air-flow and the fuel-flow as is evident from the circuit of Fig. 1. If the pressure control had been in an unbalanced condition so that relay 117 had been actuated prior to the actuation of relay 115, then it can be seen from the circuit of Fig. 3 that there would be completed through the upper contacts of relay 116 and the lower contacts of relay 117 a circuit for current flow to energize motor winding 121. As a result, the opening of valve 67 would be increased and there would be a consequent decrease in steam pressure as well as an increase in output of generator 11 resulting from increased steam flow. In other words, when the control affecting the fuel input indicates a need for increased input to correspond with the desired increase in output and when the pressure control simultaneously indicates an excessive pressure in the steam line 58, the circuit of Fig. 3 allows for control of steam pressure by actuation of valve 67 which in this case is in a direction to correct at the same time the output of generator 11 to a higher value as required to meet the new increased requirements. The circuit of Fig. 3 prevents operation of the heat-input control unless or until the vapor pressure in line 58 is either at the set point determined by the selected position of slidewire 70a or deviates in a direction to augment the change in heat-input needed to meet load requirements. As can be seen by examination of Fig. 3, the interlocking action as above described is also accomplished when the control bridges 14a and the pressure control bridge are in a condition other than specified above.

In the description of Fig. 3, it was shown that the fuel input control to the vapor generator and the steam pressure control operating on the throttle valve 67 in the steam line 58 could be coordinated in manner to prevent any unnecessary control action by one of the controllers which would wholly or partly be cancelled by action of the other controller. Such an arrangement substantially reduces interaction between the two controls; it is also possible to establish a quantitative relationship between the control action of the fuel input controller and the action of the pressure controller so that both controls concurrently serve to change system conditions by proper amounts and in proper sense at all times.

Such a quantitative relationship is established by the circuit of Fig. 4 in which controller 47 has been shown in greater detail with provision for the addition of a supplementary signal $E_{23}$. The signal $E_{23}$ is a voltage which is derived from bridge circuit 125 whose supply voltage is varied in accordance with the position of slidewire 17 and hence is proportional to the actual output of generator 11 (and is further under the control of manually adjustable slidewire 128). Slidewire 126 is positioned simultaneously with slidewire 69 in accordance with the steam pressure as measured by Bourdon tube 25. Slidewire 127 is positioned in accordance with the pressure set point as also set on slidewire 70a. The voltage $E_{23}$ is therefore a function of the actual output of generator 11 and the difference between the steam pressure and the steam pressure-set point as established by bridge 125. Consequently with the voltage $E_8$ obtained as described in Fig. 1 or as indicated in the description of Fig. 2, the fuel feed controller 47 serves to control the fuel flow in fuel line 85, by changing the position of valve 55, in direct proportion to the sum of voltages $E_8$ and $E_{23}$. The fuel flow is controlled in a manner similar to that described for the feed-water flow control in connection with Fig. 1 with the exception that as shown in Fig. 4 the fuel feed controller 47 includes the supplementary signal $E_{23}$. There is thus provided in the control of fuel valve 55 the additional proportional response to voltage $E_{23}$ which serves to establish a heat input to the vapor generator which is not only related to the generation requirement but also to the steam pressure in steam line 58. If, for example, there is a requirement for an increase in the fuel input to accommodate an increased generation requirement existing simultaneously with a high steam pressure, the fuel input will be initially modified to a smaller degree than would be the case if $E_{23}$ were omitted. The correction of steam pressure by positioning valve 67 provides additional steam flow temporarily and thus helps satisfy the need for increased generation independently of the changes in fuel supply. When desirable similar effect upon the supplies of fuel, air and water can be obtained by introducing supplementary voltage $E_{23}$ in series with voltage $E_3$ of Fig. 1.

The pressure control shown in the modified system of Fig. 4 is similar to that of Fig. 1 except that there is introduced by means of slidewire 130 a signal proportional to the generation requirement. Such relation may be obtained by moving slidewire 130 in correspondence with generation-requirement slidewire 15 of Fig. 1. Voltage $E_{12}$ is omitted. Slidewire 132 in bridge network 131 is positioned in accordance with the output of generator 11 as measured by a wattmeter W and therefore in the arrangement shown in Fig. 4 bridge 131 provides an output signal $E_{14}$ which is indicative of the difference between the actual generation and the required generation. That signal is then introduced as a supplementary signal into the control network 73, 73a so that the positioning of motor 77 includes a proportional and reset response to signal $E_{14}$. By introducing the supplementary voltage $E_{14}$ in the manner indicated, there is provided a coordination between the pressure control and the fuel feed control so that if there exists, for example, a high pressure in steam line 58 and simultaneously there exists a requirement for decrease in the output of generator 11, then the pressure control will not open up valve 67 by the same amount as would be the case with the control of Fig. 1. Operation of the fuel control will itself have a tendency to decrease the pressure as the fuel firing is cut back to accommodate the smaller load. Thus by means of voltage $E_{14}$ this factor is taken into account so that valve 67 is opened to a smaller degree and the additional action which is necessary to reduce the pressure to its set point will be accomplished indirectly by the cut back of fuel input.

Quantitatively relating the fuel input control and the steam pressure control may also be attained by utilizing a sum and difference control disclosed in Jenkins patent application Serial No. 333,494, filed January 27, 1953. In such use of the Jenkins system and method, the fuel input control is operated in accordance with the sum of the deviation of steam pressure from its set point and the deviation of the generation of generator 11 from the required value. The motor 77, and hence the throttle valve 67, is then controlled in accordance with the difference between these two quantities.

Figure 5:
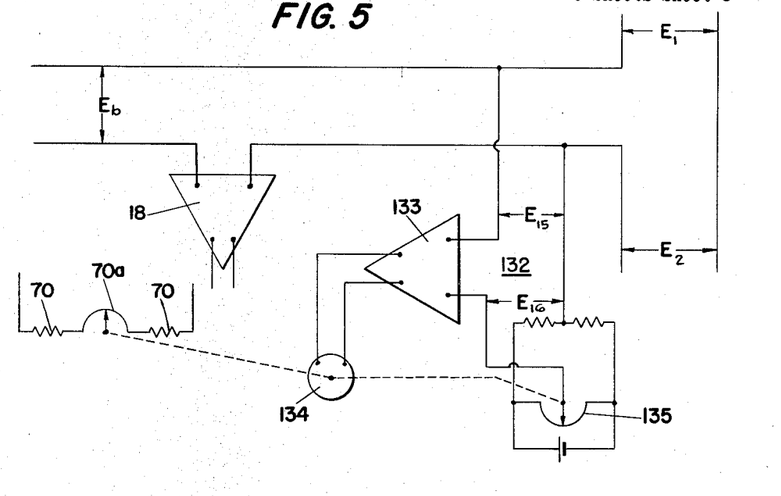

In the description of Fig. 1 it was pointed out that voltage $E_{12}$ was introduced for the purpose of utilizing the stored energy of the vapor generator to assist in the immediate relief of changing load conditions to the extent possible with the particular vapor generator involved. Another arrangement for accomplishing that type of control action is shown in Fig. 5. This modification provides means for altering the steam pressure set point in accordance with a deviation between the voltages $E_1$ and $E_2$ respectively representing actual generation and required generation. Any deviation between the voltages $E_1$ and $E_2$ is presented to the control bridge 132 as voltage $E_{15}$ which is then compared by controller 133 with the feedback voltage $E_{16}$ so that motor 134 is positioned in direct proportion to voltage $E_{15}$. Simultaneously with the positioning of motor 134 and the associated feedback slidewire 135, there is also a positioning of slidewire 70a which as shown in Fig. 1 serves to establish the steam pressure set point. Therefore, a change in generation requirement which is reflected as a change in voltage $E_2$, and hence in voltage $E_{15}$, causes a proportional change in the steam pressure set point through operation of control bridge 132 and controller 133. This change in set point causes the steam pressure control initially to change the opening of throttle valve 67 in a manner to utilize the energy storage of vapor generator 13 so immediately to vary the output of generator 11 to meet a new generation requirement.

Figure 6:
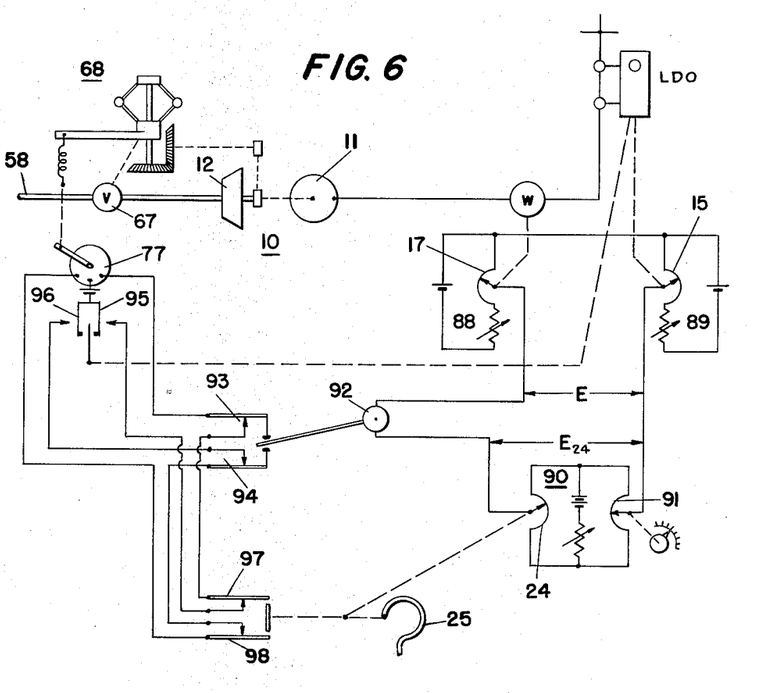
Fig. 6 schematically illustrates a further modification.

In the system shown in Fig. 6, generally as in Fig. 1, the slidewires 15, 17 and 24 are respectively positioned in accordance with the electrical generation required of unit 10, the actual output from the unit, and the pressure of vapor available for supply to the prime mover of the unit. The slidewires 15 and 17 are included in potentiometer networks 88, 89 so that they jointly produce a voltage-difference signal E corresponding in sense and magnitude with the difference between the electrical generation required of unit 10, and the actual electrical generation or output thereof. This voltage-difference signal is algebraically added to the output signal $E_{24}$ of a split-potentiometer 90 including slidewire 24 which is positioned in accordance with the available steam pressure to which the Bourdon tube 25, or equivalent, is responsive. The sense and magnitude of the output of network 90 depends upon the sense and extent of the deviation of pressure from the normal value corresponding with the setting of slidewire 91. The controller 92 responsive to the algebraic sum of the output signals of the three networks 88, 89 and 90 is for controlling the normally closed switches 93, 94 in the control circuit of governor motor 77. These switches are respectively in series with the normally open switches 95, 96 respectively closed in response to an increase and decrease of the required generation.

For purposes of explanation, it is assumed that when switch 93 is open, motor 77 cannot be energized to raise the speed setting of governor 68; and that when switch 94 is open, motor 77 cannot be energized to lower the speed setting of governor 68. Thus in the system of Fig. 6 as thus far described, when the switch 95 is closed in response to a given demand for increased generation, the resulting rise of the governor setting by motor 77 is limited by the action of controller 92 upon switch 93. Consequently the extent by which the governor setting is raised depends upon the relation between the remaining unsatisfied requirement for increased generation and the effect of the increased governor-setting upon the available steam pressure. If, for example, the pressure is reduced below a value corresponding to difference in potential between slidewires 15 and 17, a further increase of the governor setting is precluded by the opening of switch 93. This limits pressure disturbances at the steam generator and also undesired overcontrolling, since if the pressure is low, a greater valve opening will be needed to effect a given increase of actual generation. With such greater valve opening, actual generation will be too high when steam pressure is returned to normal; a lowering corrective action will then be required at the governor to reach final equilibrium.

Conversely, if the switch 96 is closed in response to a given demand for decreased generation, the resulting lowering of the governor setting by motor 77 is limited by action of controller 92 upon the normally closed series switch 94. Thus the extent by which the governor setting is lowered depends upon the relation between the remaining unsatisfied requirement for decreased generation and the effect of the lowered governor setting upon the available steam pressure.

Accordingly, increase and decrease action upon the speed setting of the governor in response to demand for increased and decreased generation is limited or checked by the resulting change in actual generation and change in available steam pressure. Such limiting action by controller switches 93, 94 occurs for a range of normal operating pressures. When, however, the pressure becomes excessively low during existence of a demand for increased generation or unduly high during a demand for decreased generation, the main motor switches 95, 96 are respectively in effect disabled by the normally closed limit switches 97, 98 controlled by the pressure-responsive device 25. If, for example, the pressure is or becomes unduly low during existence of a demand for increased generation, the normally closed switch 97 is opened to disable the circuit for the switch 95. In such case, the switch 95 remains closed until the demand for increased generation is satisfied. Usually a pressure rise will reclose switch 97, whereupon control of the governor motor circuit is resumed by the three networks 88, 89 and 90.

In the arrangement shown in Fig. 6, control of the supply of steam to the turbine 12, or equivalent prime mover, is from the difference between actual and required generation and steam pressure: the control of the heat input to the boiler which supplies the steam may operate to maintain desired steam pressure in any suitable manner well known in the art.

There are, of course, many different forms of power generating equipment which can be controlled in the manner previously set forth: some are vapor generators of the common type having steam drums providing substantial energy storage in the form of hot water and steam and others may be of the form shown in Fig. 1 wherein there is a minimum of heat storage due to the general absence of a steam drum. Still another arrangement for generating power is the nuclear reactor which may be advantageously controlled in accordance with the principles and by the control systems set forth in the prior description. It will, of course, be necessary to incorporate certain modifications of the specific arrangements described to accommodate the particular type of power generating equipment. When a nuclear power plant is involved, for example, a signal such as voltage $E_3$ of Fig. 1 may be utilized to provide the basic control of the nuclear reactor in generation of vapor for the prime mover. However, it would also be desirable to utilize a feedback signal, representative of the energy output of the reactor which would be maintained in balance with the signal $E_3$.

What is claimed is:

1. A system for controlling the output to an electrical distribution network of a generating unit comprising an electrical generator, a prime mover therefor and a vapor generator for supplying vapor to said prime mover; said system comprising means for producing a signal representing the electrical generation required of said unit, means responsive to said signal for correspondingly varying the heat input to said vapor generator, and means responsive to the pressure of said vapor for correspondingly varying the rate of supply of vapor to said prime mover to maintain a predetermined vapor-pressure/electrical-output relation both under constant and varying conditions of electrical generation required of the unit.

2. A system for controlling the output of a generating unit comprising an electrical generator, a prime mover therefor and a vapor generator for supplying vapor to said prime mover; said system comprising means for producing a signal representing the electrical generation required of said unit, a first measuring means including means responsive to the electrical output of said electrical generator, a second measuring means including means responsive to the pressure of vapor generated by said vapor generator, a first control means controlled by said first measuring means for varying the heat input to said vapor generator, and a second control means responsive to the second measuring means for varying the rate of supply of vapor to said prime mover to maintain a predetermined vapor-pressure/electrical-output relation both under constant and varying conditions of electrical generation required of the unit as represented by said signal.

3. A control system as in claim 2 in which the first measuring means additionally includes means responsive to said signal for variation by the first control means of the heat input in accordance with difference between the electrical output of the unit and the electrical generation required of the unit.

4. A control system as in claim 3 in which the first measuring means additionally includes means responsive to the pressure of the generated vapor.

5. A system as in claim 2 in which said first control means is additionally controlled from the pressure of said vapor, and in which said second control means is additionally controlled from the electrical output of said electrical generator.

6. A system as in claim 5 in which the first measuring means additionally includes means responsive to the vapor pressure, and in which the second measuring means additionally includes means responsive to the electrical output.

7. A system as in claim 5 in which the first control means additionally includes means responsive to the vapor pressure, and in which the second control means additionally includes means responsive to the electrical output.

8. A system for controlling the output to an electrical distribution network of a generating unit comprising an electrical generator, a prime mover therefor and a vapor generator for supplying vapor to said prime mover; said system comprising means for producing a first signal representing the electrical output of said unit, means for producing a second signal representing the pressure of vapor available for supply to said prime mover; means for producing a third signal representing the electrical generation required of the unit, and control means jointly responsive to said signals for maintaining a predetermined vapor-pressure/electrical-output relation.

9. A system as in claim 8 in which the control means includes means respectively responsive to the pressure signal alone, to the required generation signal alone, and to all three of the signals.

10. A system as in claim 8 in which the second signal is representative of the deviation from normal of the vapor pressure, and which additionally includes means responsive to the difference in magnitude between said first and third signals for shifting the normal vapor pressure.

11. A system for controlling the output to an electrical distribution network of a generating unit comprising an electrical generator, a prime mover therefor and a vapor generator for supplying vapor to said prime mover; said system comprising means for producing a signal representing the generation required of the unit, means responsive to said signal, means responsive to the actual electrical output of the unit, means responsive to the pressure of vapor available for supply to the prime mover, and control means jointly controlled from said responsive means to maintain a predetermined vapor-pressure/electrical-output relation.

12. A system for controlling the output to an electrical distribution network of a generating unit comprising an electrical generator, a prime mover therefor and a vapor generator for supplying vapor to said prime mover; said system comprising means for producing a first signal representing the electrical output of said unit, means for producing a second signal representing the pressure of vapor available for supply to the prime mover, means for producing a third signal representing the electrical generation required of the unit, and control means responsive to said signals for varying restriction means in the vapor path from said vapor generator to said prime mover.

13. A system for controlling the output to an electrical distribution network of a generating unit comprising an electrical generator, a prime mover therefor and a vapor generator for supplying vapor to said prime mover; said system comprising means for producing a signal having a component representative of the electrical generation required of the unit and a component representative of the deviation from normal of the pressure of said vapor, means for producing a second signal representative of the actual electrical generation of the unit, and control means responsive to the difference in magnitude of said signals for varying the heat input to said vapor generator.

14. A system for controlling the output of an electrical generating unit comprising an electrical generator, a prime mover therefor and a vapor generator for supplying vapor to said prime mover; said system comprising means for producing a signal representative of the electrical generation required of said unit, means for producing a second signal having components respectively representative of the electrical output of said unit and of the deviation from normal of the pressure of said vapor, and control means responsive to the difference in magnitude of said signals for varying the vapor supply to said prime mover.

15. A system for controlling the output to an electrical distribution network of a generating unit comprising an electrical generator, a prime mover therefor and a vapor generator for supplying vapor to said vapor generator; said system comprising means for producing a signal representing the electrical generation required of the unit, means for modifying said signal responsive to the difference between the electrical generation required of said unit and the actual generation of the unit, and control means responsive to the modified signal for varying the heat input to said vapor generator.

16. A system as in claim 15 in which the control means responsive to the signal varies the rates of supply of fuel, air and water to the vapor generator.

17. A system for controlling the output to an electrical distribution network of a generating unit comprising an electrical generator, a prime mover therefor and a steam generator for supplying steam to said prime mover; said system comprising means for producing a signal having a component representative of the electrical generation required of the unit and a component representative of the steam pressure, means for producing a second signal representative of the actual electrical generation of the unit, and control means responsive to the difference in magnitude of said signals for varying the rates of supply of fuel, air and water to said steam generator.

18. A system as in claim 11 additionally including means responsive to the difference in magnitude of the required generation signal and the actual generation signal for shifting the normal pressure of said vapor to utilize the storage of energy of said vapor generator in immediate relief of changing generation requirements of the unit.

19. A system as in claim 15 in which said control means varies the fuel input to said vapor generator, and in which control means responsive to the actual electrical generation of the unit varies the air input to said vapor generator.

20. A system for controlling the output to an electrical distribution network of a generating unit comprising an electrical generator, a prime mover therefor and a vapor generator for supplying vapor to said prime mover; said system comprising means for producing a first signal representative of the electrical generation required of said unit, means for producing a second signal representative of the actual electrical generation of said unit, means responsive to unbalance of said required generation signal and said actual generation signal to vary the heat input to said vapor generator in sense corresponding with said unbalance, means for producing a third signal representative of the difference between the existing vapor pressure of said vapor generator and the normal vapor pressure setting, means responsive to the actual electrical generation of said unit for shifting said normal vapor pressure setting, and means responsive to unbalance of said vapor pressure signal and a selected one of said generation signals to vary the rate of flow of vapor from said vapor generator to said prime mover in sense corresponding with said unbalance.

21. A system for controlling the output to an electrical distribution network of a generating unit comprising an electrical generator, a prime mover therefor and a vapor generator for supplying vapor to said vapor generator; said system comprising means for producing a first control effect corresponding with the electrical generation required of the unit for existing operating conditions of the network involving at least one of the factors of frequency and tie-line power, means for producing a second control effect corresponding with the actual generation of said electrical generator, means responsive to unbalance of the actual-generation control effect and the required-generation control effect to vary the heat input to said vapor generator of the unit in sense corresponding with said unbalance of the first and second control effects, means for producing a third control effect dependent upon the existing vapor pressure of the vapor generator, and means responsive jointly to said vapor-pressure control effect and said actual-generation control effect to vary the rate of flow of vapor from said vapor generator to said prime mover in sense corresponding with said unbalance of the second and third control effects.

(References on following page)

References Cited in the file of this patent

UNITED STATES PATENTS

| | | |
|---|---|---|
| 2,053,061 | Bristol | Sept. 1, 1936 |
| 2,243,944 | Donaldson | June 3, 1941 |
| 2,422,129 | Perley et al. | June 10, 1947 |
| 2,666,170 | Davis | Jan. 12, 1954 |
| 2,681,418 | Bristol | June 15, 1954 |
| 2,692,342 | Nichols et al. | Oct. 19, 1954 |
| 2,754,429 | Philips | July 10, 1956 |
| 2,773,994 | Cohn | Dec. 11, 1956 |